United States Patent [19]

Treisman et al.

[11] Patent Number: 4,890,903
[45] Date of Patent: Jan. 2, 1990

[54] SUSPENSION SYSTEM FOR A FLEXIBLE OPTICAL MEMBRANE

[76] Inventors: Michel Treisman, 18 Lakeside, Oxford, OX2 8JG, United Kingdom
Joshua D. Silver, 19 Cumnor Rise Road, Oxford, OX2 9HD, United Kingdom

[21] Appl. No.: 196,385

[22] Filed: May 19, 1988

[51] Int. Cl.⁴ .............................................. G02B 3/12
[52] U.S. Cl. ................................................... 350/419
[58] Field of Search ........................................ 350/419

[56] References Cited

U.S. PATENT DOCUMENTS

| 504,890 | 9/1893 | Ohmart | 350/419 |
|---|---|---|---|
| 2,300,251 | 1/1979 | Flint . | |
| 3,161,718 | 2/1979 | De Luca . | |
| 4,059,346 | 11/1977 | Levine et al. . | |
| 4,444,471 | 4/1984 | Ford et al. . | |
| 4,466,706 | 8/1984 | Lamothe . | |
| 5,292,222 | 9/1988 | Williams et al. . | |

FOREIGN PATENT DOCUMENTS

| 71710 | 1/1986 | Fed. Rep. of Germany . |
|---|---|---|
| 1543657 | 3/1980 | France . |
| 1602997 | 2/1984 | France . |
| 914827 | 5/1985 | France . |
| 241033 | 2/1983 | Switzerland . |
| 758668 | 9/1978 | United Kingdom . |
| 571912 | 1/1981 | United Kingdom . |
| 43032 | 12/1981 | United Kingdom . |

OTHER PUBLICATIONS

IBM Technical Disclosure Bulletin, vol. 24, No. 1B, Jun. 1981 by J. C. Edwards.

*Primary Examiner*—Bruce Y. Arnold
*Assistant Examiner*—Rebecca D. Gass
*Attorney, Agent, or Firm*—Michael J. Striker

[57] ABSTRACT

An adjustable liquid lens or mirror has a chamber delimited by a flexible membrane surface, which flexible membrane is supported in tension between a pair of resilient rings. A first fluid medium fills the chamber which, in the case of a lens, has a different refractive index from that of a second fluid medium contacting the other side of the flexible membrane. An annular support member for the flexible membrane comprises relatively movable first and second component parts, the first and second component parts of the support member being adjustably linked in a fluid-tight manner whereby the volume of the chamber is adjustable by moving one component part of the support member relative to the other in such wise as to vary the pressure in the first fluid medium and thereby to alter the shape of the said membrane surface.

17 Claims, 3 Drawing Sheets

SUSPENSION SYSTEM FOR A FLEXIBLE OPTICAL MEMBRANE

TECHNICAL FIELD

This invention relates to a suspension system for holding under tension a flexible membrane employed as a boundary surface of a liquid lens of adjustable focus or a flexible membrane mirror and to a new design of liquid lens, the focal length of which can be altered by relative movement between component parts of the lens holder. The invention also relates to an adjustable focus mirror.

A liquid lens consists of at least one flexible transparent membrane which defines a boundary surface of a space that can be filled with a liquid. The liquid can be at a higher or lower pressure than the medium (usually air) contacting the other side of the membrane, the pressure difference across the membrane causing it to curve so that the liquid-filled space functions as a lens.

A membrane mirror consists of a flexible membrane suspended in a frame of circular or other shape and with a reflective coating on one or both sides. Pressure applied to the membrane causes it to assume an appropriate conformation and allow the reflective coating to function as a mirror.

For each device, the membrane requires to be appropriately supported while the required shape-deforming pressure is applied to it. The present invention provides a method of supporting a membrane, forming part of a liquid lens or flexible mirror, under tension and thus provides improved liquid lenses and mirrors.

SUMMARY OF THE INVENTION

According to one aspect of this invention, the boundary surface of a liquid lens or flexible mirror is defined by a flexible membrane supported between two resilient rings confronting one another, a circumferential zone of each ring surrounding the said boundary surface being compressed against the membrane.

Conveniently the resilient rings are identical rings of elastomeric material of circular cross-section (known as O-rings) but identical rings of elastomeric material of non-circular cross-section can also be used.

It is also possible to use rings of different cross-sections on the opposite sides of the membrane and even rings of somewhat different diameters, provided confronting zones are produced around the boundary surface.

In place of solid O-rings, hollow O-rings can be used. The pressure in a hollow O-ring can be varied to modify the radial tensions induced by it. Hollow O-rings can be divided into two or more sealed sections of the same or different lengths whereby the properties of each section can be altered by gas or liquid pumped into them. By varying the pressure in different sections, unequal radial tensions can be induced in the supported membrane. This allows controllable compensation for unequal forces acting on the membrane, such as centrifugal forces (if the boundary surface is part of a rotating system) or gravitational forces.

The resilient ring may be held in its supporting frame but not attached to it. However, the ring may be bonded to a supporting frame or even be an integral part of it. Thus, for example a moulded frame of plastics material may have an extrusion with a semi-circular cross-section or a cross-section of some other appropriate shape extending from the frame in a position in which the resilient ring is required. To ensure adequate resilience, the extruded ring may be hollow.

Two identical resilient rings can be supported opposite one another in a frame and the membrane placed between the two rings. Pressure can be applied to the rings via the frame to cause the line of contact each ring makes with the membrane to become an annular zone producing an outwardly directed radial tension at all points in the membrane, and thus holding it in a flat condition under tension.

The compression forces applied at different parts of the circumference of the annular frame can be varied. This will cause different radial tensions in different parts of the membrane and allow controllable compensation for unequal forces which might be acting on the membrane (such as the centrifugal or gravitational forces mentioned above).

The force on the supported membrane at any point where the rings contact it, is determined by the compression forces acting on the resilient rings and the diameter and cross-sectional shape of the rings. The local force on the resilient rings may be altered by changing any of these parameters.

According to a further aspect of the invention an adjustable liquid lens or mirror comprises a chamber delimited by a flexible membrane surface, a first fluid medium filling the chamber which, in the case of a lens, has a different refractive index from that of a second fluid medium contacting the other side of the flexible membrane, and an annular support member for the flexible membrane comprising relatively movable first and second component parts, the first and second component parts of the support member exhibiting closely adjacent matching surfaces (eg cylindrical) between which an O-ring seal is located and being adjustably linked in a fluid-tight manner whereby the volume of the chamber is adjustable by moving one component part of the support member relative to the other in such wise as to vary the pressure in the first fluid medium and thereby to alter the shape of the said membrane surface, the membrane defining said membrane surface being held in place between a compressed pair of O-rings.

The lens or mirror desirably has the component parts of the support member screw-threaded together so that relative rotation of one in or on the other causes the required pressure change in the first fluid medium. Alternatively, one component part may fit into the other so that by sliding it in or out (by use of a ratchet or other means) the pressure may be altered accordingly.

BRIEF DESCRIPTION OF THE DRAWINGS

The invention will now be further described, by way of example, with reference to the accompanying drawings, in which.

DESCRIPTION OF PREFERRED EMBODIMENTS

Figure 1:
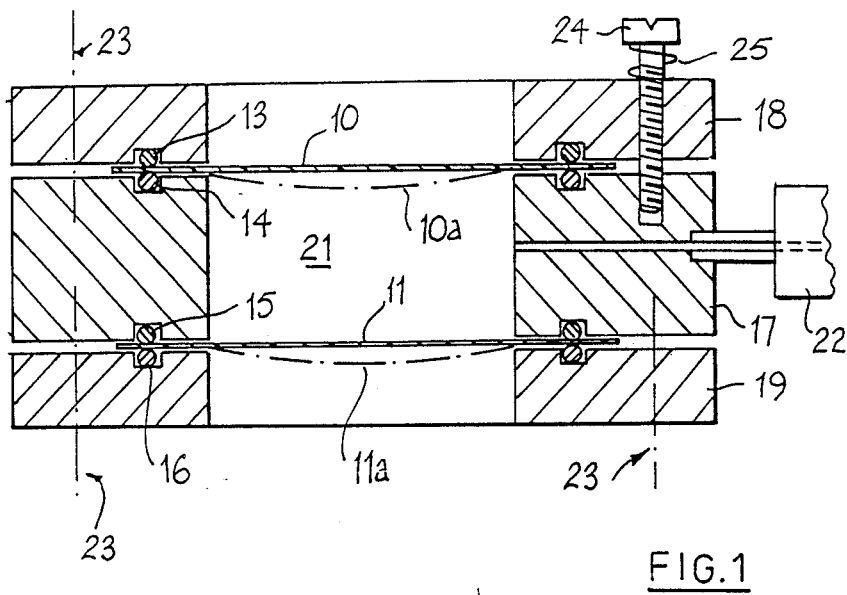
FIG. 1 shows, in schematic cross-section, a first embodiment of liquid lens in accordance with this invention.

FIG. 1 shows a liquid lens formed between flexible membranes 10 and 11. The membranes in this example are of high-grade plastic foil (e.g. that known under the Trade Mark "MELINEX") and have a thickness of some twelve microns. Each membrane is clamped between a pair of O-rings 13–16 supported in an annular frame made up of a body 17 and two end caps 18, 19. The O-rings are received in grooves in the frame and these are sized to ensure each O-ring is compressed (e.g. by 380 to 500 μm) against the respective membrane.

The body 17 is provided with a through-passage 20 through which a transparent liquid is fed into a space 21 defined within the body 17 between the membranes 10 and 11. A syringe (part shown at 22) can be connected to the passage 20 to vary the volume of liquid in the space 21 and thus vary the shape of the membranes 10, 11. The chain line 10a shows how the membrane 10 might appear with a reduced pressure in the space 21 and the line 11a how the membrane 11 might appear with a supra-atmospheric pressure in the space 21.

Each end cap 18, 19 is clamped to the body 17 by a number of fixing means 23. One of the fixing means has been shown as a screw 24 threaded into the body 17 and compressing the O-rings against the respective membrane via a spring 25. The spring 25 can be omitted and the screw 24 can be replaced by U-clamps or other fixing means.

Figure 2:
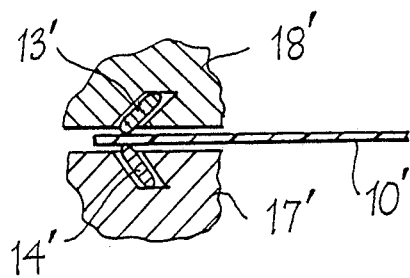
FIG. 2 shows, in cross-section, an alternative form of resilient ring for supporting a membrane in the lens of FIG. 1.

FIG. 2 shows a scrap section through part of the frame of a liquid lens, the membrane being shown at 10', one end cap at 18', part of the body at 17', and the sealing rings at 13', 14'. In this case, the rings 13', 14' are of non-circular cross-section and the grooves locating them are inclined to the axis of the aperture in the end cap 18'.

Figure 3:
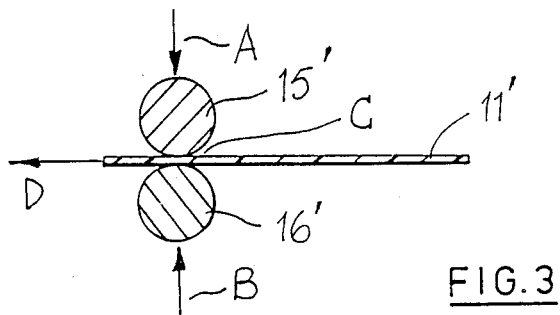
FIG. 3 illustrates the mode of operation of the resilient rings in supporting the membrane.

FIG. 3 shows the cross-section of two O-rings 15', 16' with a membrane 11' grasped between them. When downward pressure is applied on the upper ring 15' at A, and upward pressure on the lower ring 16' at B, the resultant forces in the plane of the membrane 11' acting at the position of contact, C, tend to move this outward, in the direction of the arrow D. This causes radial stretching of the membrane 11'.

The membrane 10 (11) can be silvered on either or both of its upper and lower surfaces to create a mirror of variable curvature. In the case of a mirror, one of the membranes can be replaced by a non-flexible plate closing off the volume 21 and in the case of a lens, one of the flexible membranes 10 or 11 can be replaced by a rigid lens to make a two-part combination lens, one part of which is a liquid lens. Clearly locating a rigid lens in the space 21 between two flexible membranes will give rise to a three-part combination lens, the two outer parts of which are liquid lenses. Other combinations of liquid/-solid lenses are clearly possible.

It is also possible to have liquid on the side of the membrane 10/11 outside the space 21, the latter containing a gas or a liquid with a different refractive index from that appearing outside the space 21.

Figure 4:
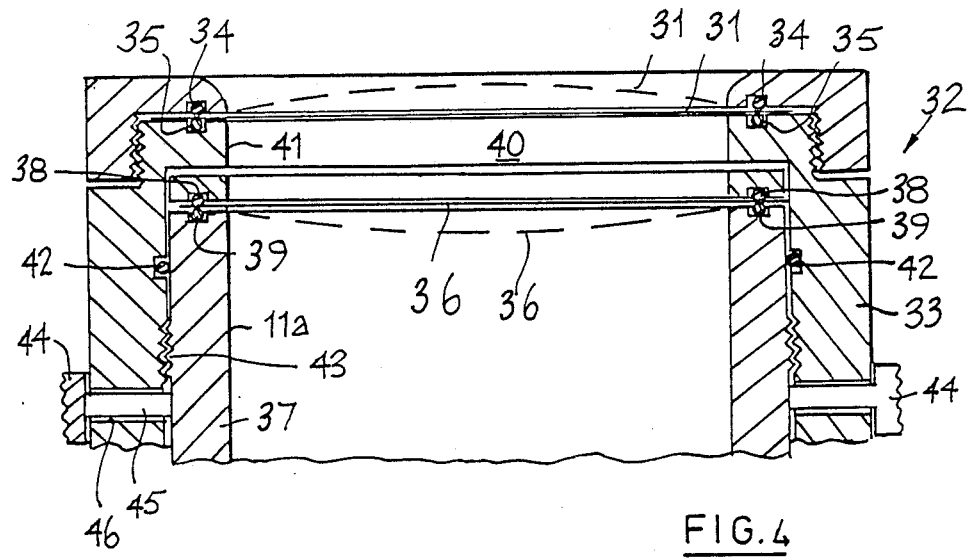
FIG. 4 is a purely schematic sectional side elevation of a second embodiment of liquid lens according to the invention.

FIG. 4 (not drawn to scale) shows a further embodiment of adjustable power lens. An anterior flexible transparent membrane 31 is held in an outer part 33 of an annular holder 32 between a pair of O-rings 34 and 35. A posterior membrane 36 is held in a similar manner in an inner part 37 of the holder 32 by a further pair of O-rings 38, 39. The cavity 40 defined in the bore 41 of the holder between the membranes 31 and 36 is filled with a suitable liquid such as water, alcohol, gelatine or glycerol, and an O-ring seal 42 prevents leakage of the filling liquid between the parts 33 and 37. The part 37 screws into the part 33 at 43. By screwing the holder part 37 towards or away from the holder part 33, the pressure in the cavity 40 can either be increased causing the membranes 31, 36 to flex outwardly and the liquid lens to become more positive, or reduced, causing the liquid lens to become more negative. The medium in contact with the upper surface of the membrane 31 and the lower surface of the membrane 36 would normally be air but it will be appreciated this need not be the case. The bore 11a could contain some other gas or even a liquid of different refractive index from that filling the cavity 40.

The means for turning part 37 relative to part 33 of the holder 32 to effect a lens power change can take many forms. It could, for example, be a knurled ring 44 surrounding part 33 and connected to part 37 via a rod 45 located in an arcuate slot 46 in the part 33. Displacement without rotation is also possible (e.g. with an external screw clamp).

Figure 5:
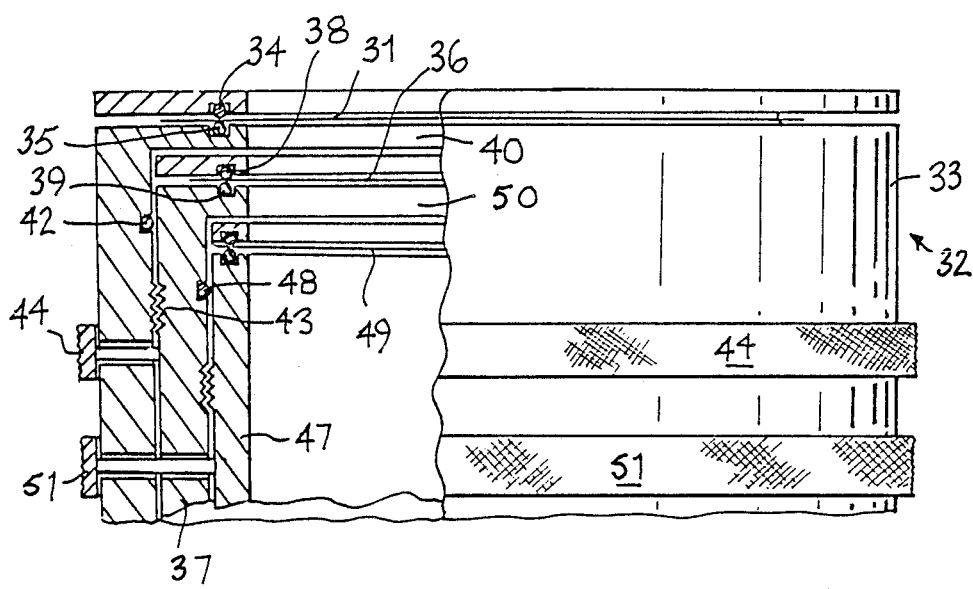
FIG. 5 is a view similar to FIG. 4 but of a two cavity liquid lens.

FIG. 5 shows a rather more complex liquid lens having two liquid lenses one above the other. Where appropriate the same reference numerals have been used in FIG. 5 as were used in FIG. 4 to designate similar integers. The compound adjustable membrane autofocus lens shown in FIG. 5 has a third housing part 47 screw-threaded into the part 37 with a separate O-ring seal 48.

The third part 47 supports an O-ring tensioned third membrane 49 which defines a second cavity 50 inside the bore 31a. The third part 47 can be axially adjusted relative to the second part 37 to adjust the pressure in the liquid filling the cavity 50. This adjustment could be by way of a ring 51 operating in a manner similar to that described above for the ring 44. Since membrane 36 is now common to the cavities 40 and 50 adjustment of the pressure in one will have an effect on the power of the liquid lens defined by the other. This may be of advantage, but if not, can readily be compensated for by appropriate readjustment of the other ring 44 or 51. Different liquids can be used in the two cavities 40 and 50.

Figure 6:
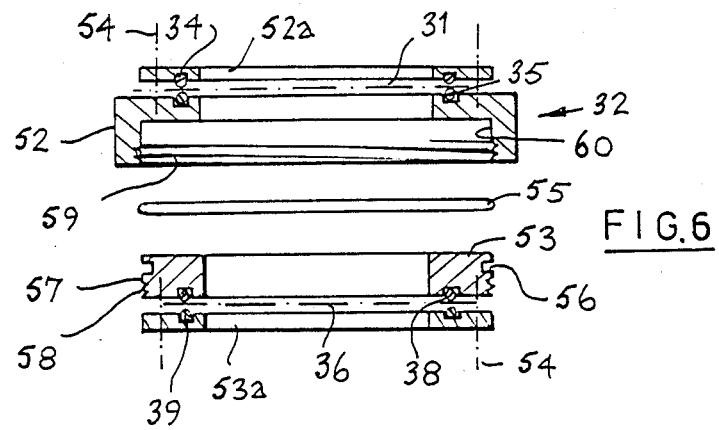
FIG. 6 shows a schematic exploded sectional side elevation of a fourth embodiment of liquid lens according to the invention.
Figure 7:
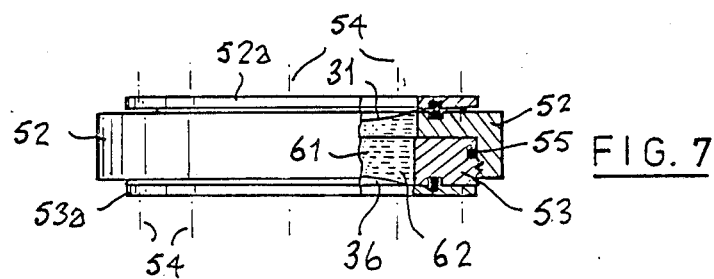
FIG. 7 shows a partly sectioned side view of the assembled liquid lens of FIG. 6.

FIGS. 6 and 7 illustrate a lens of a relatively compact design. As with the previous designs there are two transparent membranes (e.g. 23 micron thickness type D "MYLAR" (RTM) material) 31 and 36 (shown only in chain lines) tensioned between respective pairs of O-rings 34, 35 and 38, 39. The housing 32 comprises a pair of annular members 52 and 53 which when interengaged with the membranes in place define a fluid-tight chamber of variable volume. The O-rings 34, 35 are pressurised on either side of the membrane 31 by an annular fixing plate 52a and the O-rings 38, 39 are pressurised on either side of the membrane 36 by an annular fixing plate 53a. Both fixing plates are tightened in place to tension the respective "MYLAR" membrane by means of a ring of screws (only shown schematically at 54).

The annular members 52, 53 are sealed in fluid-tight manner by an O-ring 55 designed to be located in a groove 56 in a cylindrical outer surface 57 of the member 53. A part 58 of the surface 57 is screw-threaded to mesh with a threaded part 59 of a second cylindrical surface 60 forming part of the member 52. The size of the O-ring 55 and the dimensions of the groove 56 in which it is located are selected (in known manner) to obtain sufficient deformation of the O-ring to provide a good fluid-tight seal between the surfaces 57 and 60 but not so great a deformation as to make it difficult to occasion relative rotation between the members 52, 53 when the power of the lens is to be adjusted. The chamber 61 created in the member 52 by the seal 55 and the membranes 31 and 36 could be filled with air-free distilled water 62, for example as shown in FIG. 7.

FIG. 7 shows the FIG. 6 embodiment fully assembled and arranged to provide a negative double-concave lens. The liquid 62 filling the chamber 61 between the membranes 31 and 36 is at sub-atmospheric pressure, the pressure being adjusted by screwing the member 53 into or out of the member 52. Screwing in will reduce the power of the negative lens and screwing out will increase the power of the lens.

It will be seen therefore that the lens constructions shown in FIGS. 4 to 7 each include a piston-type arrangement in which one housing member moves as a sealed piston within the other to provide a "pumpless" lens.

In each of the lens designs illustrated one of the membranes may be replaced by a substantially rigid solid fluid-tight transparent member which may or may not have a power different from unity.

A telephoto lens is a system of lenses designed to allow a camera to photograph a magnified image of distant objects. A zoom lens is a system of lenses which can be adjusted by altering the physical arrangement of the lens components therein so as to alter the overall focal length and field of view to give it telescopic or near-field properties. Autofocus lenses of the kind described above may be used in place of solid lenses in a telephoto or zoom lens, telescope, binoculars, microscope, camera, or other optical device. They may be used in combination with fixed lenses. Thus a zoom lens can be constructed of two adjustable membrane autofocus lenses in sequence, one having a negative and the other a positive power. The relative positions of the lenses do not require to be altered in order to change the focal length of the combination. This can be done by rotating the inner or outer part of the holder of one or the other of the autofocus lenses.

If the anterior surface of a liquid lens (say membrane 31 in FIG. 4) is covered with a reflective coating, this produces a flexible membrane mirror. By displacing the inner part 37 of the holder 32 in FIG. 4, the focus of the membrane mirror 31 can be altered. A mirror of this construction can be considered to be an autofocus membrane mirror.

Figure 8:
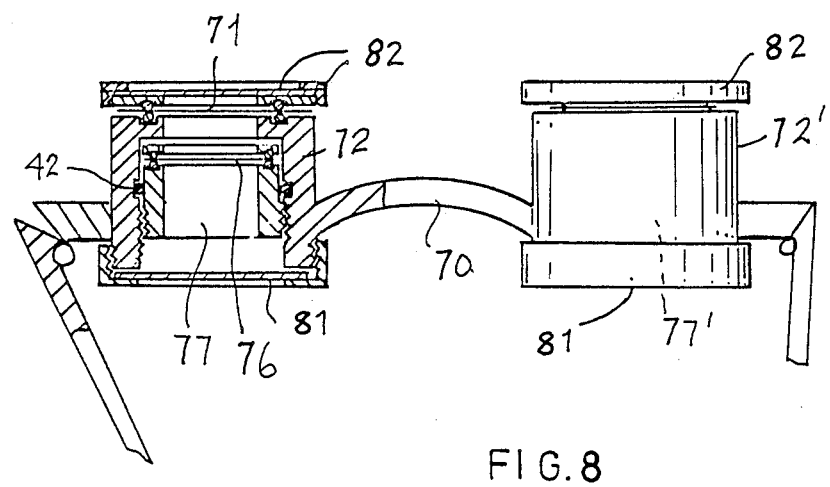
FIG. 8 shows, in schematic sectional view, a pair of spectacles with two liquid lenses according to the invention.

A pair of spectacles is a device consisting of two lenses in a frame that allows the lenses to be worn before the eyes so as to correct errors of refraction or supplement deficient accommodation. Spectacles are traditionally made with solid lenses. These have the disadvantage that the focal length is restricted (in the case of a bifocal lens to two values) and is not adjustable on demand. FIG. 8 illustrates one possible design for spectacles in which the solid lenses have been replaced by autofocus lenses. The frame (shown at 70 in FIG. 8) incorporates two holders 72, 72'. By rotating the inner parts 77 and 77' in the left and right lenses, the focus of each lens can be adjusted over a continuous range of values to suit the eye of the wearer for an object of regard at a given distance. The frame 70 may attach directly to the part 77, in which case the outer part 72 may fit on to part 77 by a screw- or slide-fitting.

Discs 81 and 82 of transparent unbreakable plastic or glass may be fixed to the rear and front of each liquid lens holder so as to protect the flexible membranes 71 and 76 from dirt and damage. The discs 81 and 82 may be clip-on or otherwise removable attachments (e.g. bayonet or screw mounted), or they could be permanently attached. The discs 81 and 82 may themselves be solid lenses that provide a basic correction to vision which can be further adjusted by altering the focal lengths of the liquid lenses. They may be planar, or they may have a cylindrical surface to allow for the correction of astigmatism. The surfaces of one or both discs may be so shaped as to correct for any aberrations associated with the liquid lens over a range of focal lengths. They may be transparent or tinted (e.g. light-intensity colour-controlled), so allowing the spectacles to be used as sunglasses of variable focus and variable tint. The spectacles of FIG. 8 use liquid lenses of the kind shown in FIG. 4 but other designs are clearly possible. Such spectacles may be embodied in a face mask or respirator so that adjustment may be made for the wearer's vision without requiring him to wear spectacles in addition to the mask.

This invention thus relates to novel types of liquid or semi-solid lenses which allow the focus of the lens to be altered directly by manipulating the relative positions of components of the holders of the lenses. Such lenses may be constructed of at least one membrane held between O-rings. Direct variation in the volume of the chamber delimited by the membrane(s) may be used to alter the internal pressure in the lens and so its focal length, giving a lens of directly adjustable focus. Such liquid lenses may be combined to produce compound lenses with both components separately adjustable or adjustable in some linked manner and they may be used to construct telescopes, zoom lenses, spectacles, cameras and a wide range of other optical devices.

If the means used for adjusting the pressure exerted on the membrane is calibrated in some way, the liquid lenses described above can be used by an opthalmologist in determining the refraction of a patient or by an optician in determining what power of spherical lens needs to be prescribed for each eye of a patient.

The calibration is conveniently arranged to read directly in dioptres but it is possible to have some other graduated scale and a reference chart to relate the scale readings to the appropriate lens power. Thus the arrangements described could be used to provide the calibration by marking a scale on one member and providing a pointer, line or other reference mark on the other, which moves along the scale as the lens power is changed.

It is envisaged that one or a few small disc-shaped liquid lenses such as that shown in FIG. 6 could be used as replacement for the many fixed focus lenses normally used in prescribing spectacles and for other opthalmic purposes.

Further, if the focal length adjustment, in say the spectacles of FIG. 8, is made sufficiently easy to operate and is manually accessible to a patient viewing through the liquid lenses, the patient can adjust the focal power to optimise the sharpness of focus he/she is experiencing during a test, thereby facilitating the selection of the correct lens power required to compensate for vision defects.

In case ageing of the membrane produces loss of calibration accuracy, a re-adjustment facility can be provided on each liquid lens to enable periodic re-calibration. For example, this could be a separate pre-settable pressure-adjusting means, or the pointer referred to above could be capable of having its position of attachment to the housing adjusted.

A cylindrical liquid lens of adjustable focus can be produced by using membranes of graded thickness and such liquid lenses can be used to correct astigmatic errors.

It is also possible to provide a liquid lens with an at least partial cylindrical lens by trapping the flexible membrane between confronting O-rings held in respective grooves that follow cylindrical surfaces. Thus, for example, the grooves accommodating O-rings 34 and 35 in FIG. 4, rather than being coplanar as shown, can each lie on a cylindrical surface, the O-ring 34 (say) lying on a first cylindrical surface of a given radius and the O-ring 35 lying on a second cylindrical surface of the same or substantially the same radius. In a pluri-chamber liquid lens, cylindrical components can be added to more than one of the membranes and the axes of the two or more different cylindrical components of the lens surfaces need not be parallel. The surfaces followed by a confronting pair of O-rings need not be cylindrical if they are non-planar thus leaving open the possibility of fabricating complex lens surface contours for specific applications.

Although the tensioned regions of the membranes disclosed thus far are circular in plan, there is no need for this to be the case and the invention should be seen to include non-circular tensioned membrane regions. In some applications a rectangular membrane could be used and such a membrane shape can be achieved either by using a rectangular O-ring (e.g. made from lengths of circular section elastomeric rod mitre-joined at the corners) or by using a pair of circumscribing circular O-rings to form the primary seal of the cavity to the membrane and to tension the membrane but contacting the tensioned membrane within the bore of the O-rings by a rectangular frame that defines the optical boundary of the liquid lens.

Various changes can be made to the constructions shown in the drawings and such constructions falling within the spirit and scope of the following claims represent systems within the ambit of this invention.

What is claimed is:

1. A suspension system for a flexible membrane serving as a boundary surface of an optical device selected from the group consisting of a liquid lens and a flexible membrane mirror, characterised in that the system comprises two resilient O-rings supported opposite one another in a frame with the membrane placed between the two O-rings, and in that pressure is applied to the O-rings via the frame to cause the line of contact each O-ring makes with the membrane to become an annular zone producing an outwardly directed radial tension at all points in the membrane, thereby holding it in the frame under tension.

2. A system as claimed in claim 1, wherein each O-ring is supported in a groove in the frame, each O-ring being compressed by 380 to 500 $\mu$m against the membrane by pressure applied to the frame.

3. A system as claimed in claim 2, characterised in that two identical resilient rings are supported opposite one another in a frame with the membrane placed between the two rings, and in which pressure is applied to the rings via the frame to cause the line of contact each ring makes with the membrane to become an annular zone producing an outwardly directed radial tension at all points in the membrane, and thus holding it in a flat condition under tension.

4. A system as claimed in claim 1, characterised in that two identical resilient rings are supported opposite one another in a frame with the membrane placed between the two rings, and in which pressure is applied to the rings via the frame to cause the line of contact each ring makes with the membrane to become an annular zone producing an outwardly directed radial tension at all points in the membrane, and thus holding it in a flat condition under tension.

5. A mirror having as its reflective surface a flexible membrane supported by a suspension system as claimed in claim 1.

6. An adjustable liquid lens comprising a chamber delimited by a transparent flexible membrane, a first fluid medium filling the chamber which has a different refractive index from that of a second fluid medium contacting the other side of the flexible membrane, and an annular support member for the flexible membrane comprising relatively movable first and second components parts, the first and second component parts of the support member exhibiting closely adjacent matching surfaces between which an O-ring seal is located and being adjustably linked in a fluid-tight manner whereby the volume of the chamber is adjustable by moving one component part of the support member relative to the other in such wise as to vary the pressure in the first fluid medium and thereby to alter the shape of the said flexible membrane, the flexible membrane being held in place between a compressed pair of O-rings supported opposite one another in the first part of said annular support member, pressure applied to the O-rings via the said first part of the support member causing each O-ring to contact the membrane along an annular zone and generating an outwardly directed radial tension at all points in the membrane to hold it in the said first part of the support member under tension.

7. A lens as claimed in claim 6 in which the first fluid medium is a transparent liquid.

8. A lens as claimed in claim 7, characterised in that the component parts of the support member are screwthreaded together so that relative rotation of one in or on the other causes the required pressure change in the first fluid medium.

9. A lens as claimed in claim 6 in which the first fluid medium is a semi-solid or gelatinous substance.

10. A lens as claimed in claim 6 in which the component parts of the support member are screw-threaded together so that rotation of one relative to the other causes the required pressure change in the first fluid medium.

11. A liquid lens as claimed in claim 10, characterised by having two spaced-apart flexible membrane surfaces delimiting the fluid-filled chamber, the relatively adjustable component parts of the membrane support member being screw-threaded together over part of interengaging cylindrical surfaces with an O-ring interposed between said surfaces, said O-ring defining a part of the boundary surface of said chamber, whereby rotation of one support member part relative to the other changes the pressure of the first fluid within the chamber and thus effects a change in shape of each flexible membrane surface, each membrane defining a membrane surface being held in place in its respective support member between a compressed pair of O-rings.

12. A liquid lens as claimed in claim 6 in which two spaced-apart flexible membranes delimit the fluid-filled chamber one membrane being tensioned in each of said first and second component parts of the support member, the relatively adjustable first and second component parts of the membrane support member being screw-threaded together over part of confronting coaxial cylindrical surfaces with an O-ring interposed between said surfaces, said O-ring defining a part of the boundary surface of said chamber, whereby rotation of one support member part relative to the other changes the pressure of the first fluid within the chamber and thus effects a change in the shape of each flexible membrane, each membrane being held in place in its respective support member between a compressed pair of O-rings which generate opposed annular zones creating outwardly directed radial tension in each membrane.

13. A liquid lens as claimed in claim 12 in which there are three flexible membranes defining two adjacent fluid-filled chambers formed in a housing having outer, middle and inner components, one of said chambers being defined in part by a seal formed between the outer and middle components and the other of said chambers being defined in part by a seal formed between the middle and inner components, the third membrane also being held in place between a compressed pair of O-rings which generate opposite annular zones creating outwardly directed radial tension in each membrane.

14. A liquid lens as claimed in claim 13 in which relative movement is possible between the middle and outer components to vary the volume of the said one chamber and relative movement is possible between the middle and inner components to vary the volume of the said other chamber.

15. A pair of liquid lenses as claimed in claim 6 mounted side by side in a frame to create a pair of spectacles.

16. A pair of liquid lenses as claimed in claim 6 mounted side by side in a frame to create a pair of goggles.

17. A suspension system for a flexible membrane serving as a boundary surface of an optical device characterised in that the system comprises two resilient O-rings supported opposite one another in a frame with the membrane placed between the two O-rings, and in that pressure is applied to the O-rings via the frame to cause the line of contact each O-ring makes with the membrane to become an annular zone producing an outwardly directed radial tension at all points in the membrane, thereby holding it in the frame under tension.

* * * * *